United States Patent
Yoon et al.

(10) Patent No.: US 10,979,950 B2
(45) Date of Patent: Apr. 13, 2021

(54) METHOD AND DEVICE FOR IMPROVING COMMUNICATION QUALITY IN MOBILE COMMUNICATION NETWORK

(71) Applicant: Samsung Electronics Co., Ltd., Suwon-si (KR)

(72) Inventors: Taiho Yoon, Yongin-si (KR); Indae Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 15/303,471

(22) PCT Filed: Apr. 9, 2015

(86) PCT No.: PCT/KR2015/003563
§ 371 (c)(1),
(2) Date: Oct. 11, 2016

(87) PCT Pub. No.: WO2015/156614
PCT Pub. Date: Oct. 15, 2015

(65) Prior Publication Data
US 2017/0041842 A1 Feb. 9, 2017

(30) Foreign Application Priority Data
Apr. 11, 2014 (KR) .......................... 10-2014-0043605

(51) Int. Cl.
*H04W 24/02* (2009.01)
*H04W 24/04* (2009.01)
(Continued)

(52) U.S. Cl.
CPC .......... *H04W 36/08* (2013.01); *H04L 1/1816* (2013.01); *H04W 24/02* (2013.01);
(Continued)

(58) Field of Classification Search
CPC . H04W 36/02; H04W 36/0016; H04W 36/24; H04L 47/34; H04L 1/1816; H04L 29/06027
(Continued)

(56) References Cited

U.S. PATENT DOCUMENTS 8,320,392 B1 * 11/2012 Wang ................. H04L 49/9005
370/412
8,547,937 B1 10/2013 Pankajkshan et al.
(Continued)

FOREIGN PATENT DOCUMENTS

CN 101374349 A 2/2009
CN 101521919 A 9/2009
(Continued)

OTHER PUBLICATIONS

NEC: Lossless/Seamless Intra-LTE Handover; 3GPP TSG RAN2#55; R2-0602948; Oct. 9-13, 2006; Seoul, Korea.
(Continued)

*Primary Examiner* — Asad M Nawaz
*Assistant Examiner* — Jason A Harley
(74) *Attorney, Agent, or Firm* — Jefferson IP Law, LLP

(57) ABSTRACT

According to one embodiment of the present invention, a method and a device for improving communication quality in a mobile communication network are provided, and the method further comprises the steps of transmitting downlink packets for IP-based voice traffic to a terminal in a radio link unacknowledged mode (RLC UM) and storing at least one packet among the downlink packets for retransmission. In addition, the present invention provides a communication method and device of a target base station for retransmitting the stored packet to the terminal. Furthermore, the present invention provides a method and a device of a terminal that receives a packet from the target base station.

12 Claims, 10 Drawing Sheets

(51) Int. Cl.
*H04L 1/18* (2006.01)
*H04W 36/00* (2009.01)
*H04W 76/19* (2018.01)
*H04W 36/08* (2009.01)
*H04W 36/02* (2009.01)
*H04W 36/30* (2009.01)
*H04J 11/00* (2006.01)
*H04L 5/00* (2006.01)

(52) U.S. Cl.
CPC ....... *H04W 36/0079* (2018.08); *H04W 36/02* (2013.01); *H04W 36/30* (2013.01); *H04J 11/00* (2013.01); *H04L 5/0055* (2013.01)

(58) Field of Classification Search
USPC .......................................... 370/331; 455/436
See application file for complete search history.

(56) References Cited

U.S. PATENT DOCUMENTS

| | | | |
|---|---|---|---|
| 2001/0043579 A1* | 11/2001 | Tourunen | H04L 12/08 370/331 |
| 2006/0050723 A1* | 3/2006 | Yu | H04L 47/10 370/412 |
| 2007/0268861 A1* | 11/2007 | Diachina | H04L 1/1848 370/329 |
| 2007/0268887 A1* | 11/2007 | Schwartz | H04J 3/0632 370/352 |
| 2007/0286125 A1* | 12/2007 | Lee | H04W 36/02 370/331 |
| 2008/0031258 A1* | 2/2008 | Acharya | H04L 69/22 370/395.42 |
| 2008/0285566 A1 | 11/2008 | Sammour et al. | |
| 2008/0310368 A1* | 12/2008 | Fischer | H04W 36/02 370/331 |
| 2009/0046660 A1 | 2/2009 | Casati et al. | |
| 2009/0052401 A1 | 2/2009 | Nakajima | |
| 2009/0185477 A1* | 7/2009 | Lee | H04L 1/1825 370/216 |
| 2009/0201875 A1* | 8/2009 | Hasegawa | H04W 72/1242 370/329 |
| 2009/0270099 A1 | 10/2009 | Gallagher et al. | |
| 2010/0002650 A1 | 1/2010 | Ahluwalia | |
| 2010/0067481 A1* | 3/2010 | Maeda | H04L 1/1874 370/331 |
| 2010/0067490 A1* | 3/2010 | Chiu | H04L 12/1877 370/331 |
| 2010/0290400 A1* | 11/2010 | Lee | H04L 1/1825 370/328 |
| 2010/0309886 A1 | 12/2010 | Vikberg et al. | |
| 2010/0322197 A1 | 12/2010 | Adjakple et al. | |
| 2011/0103311 A1 | 5/2011 | Navratil et al. | |
| 2011/0205928 A1 | 8/2011 | Pelletier et al. | |
| 2011/0207462 A1* | 8/2011 | Hallenstal | H04W 36/24 455/436 |
| 2012/0008573 A1* | 1/2012 | Shiva | H04W 72/1252 370/329 |
| 2012/0044859 A1 | 2/2012 | Hapsari et al. | |
| 2012/0054395 A1* | 3/2012 | Yamamoto | G06F 15/17375 710/240 |
| 2012/0314690 A1 | 12/2012 | Xu et al. | |
| 2013/0070598 A1 | 3/2013 | Shiva et al. | |
| 2013/0322325 A1* | 12/2013 | Hahn | H04W 36/0055 370/315 |
| 2014/0098797 A1* | 4/2014 | Kanamarlapudi | H04L 1/1867 370/336 |

FOREIGN PATENT DOCUMENTS

| | | |
|---|---|---|
| CN | 101925116 A | 12/2010 |
| CN | 102187709 A | 9/2011 |
| CN | 102461258 A | 5/2012 |
| CN | 102783212 A | 11/2012 |
| CN | 102791008 A | 11/2012 |
| CN | 103069871 A | 4/2013 |
| EP | 2 699 038 A1 | 2/2014 |
| KR | 10-1054213 B1 | 8/2011 |
| WO | 2007/091482 A1 | 8/2007 |
| WO | 2010044721 A1 | 4/2010 |

OTHER PUBLICATIONS

ETSI; LTE; Evolved Universal Terrestrial Radio Access (E-UTRA) and Evolved Packet Core (EPC); User Equipment (UE) conformance specification; Part 1: Protocol conformance specification (3GPP TS 36.523-1 version 8.1.0 Release 8); Apr. 2009; France.
Philips, "Support of RLC level retransmissions for MBMS", 3GPP Draft; R2-040808, 3rd Generation Partnership Project (3GPP), Mobile Competence Centre ; 650, Route Des Lucioles; F-06921 Sophia-Antipolis Cedex; France, 3GPP TSG RAN WG2 MBMS adhoc, XP050141643, Budapest, Hungary; Apr. 17, 2004.
LG Electronics, 3GPP Draft; R2-050887, RLC UM Error Recovery, 3rd Generation Partnership Project (3GPP), Mobile Competence Centre; 650, Route Des Lucioles; F-06921 Sophia-Antipolis Cedex: France, 3GPP TSG-RAN WG2#46 bis, XP050602518, Beijing, China; Apr. 4, 2005.
Ericsson, "QCI based access barring for smart congestion mitigation", 3GPP TSG-RAN WG2#85 R2-140636, Feb. 1, 2014, pp. 1-4 (document with the well-known feature), Feb. 1, 2014.
Japanese Office Action dated Dec. 17, 2018, issued in Japanese Application No. 2016-561765.
Chinese Office Action dated Mar. 28, 2019, issued in Chinese Application No. 201580024295.9.
Chinese Office Action dated Nov. 15, 2019, issued a counterpart Chinese Application No. 201580024295.9.

* cited by examiner

METHOD AND DEVICE FOR IMPROVING COMMUNICATION QUALITY IN MOBILE COMMUNICATION NETWORK

TECHNICAL FIELD

The present invention relates to a communication quality enhancement method and apparatus for use in a mobile communication network.

BACKGROUND ART

The mobile communication system has been developed for a user to communicate on the move. With the rapid advance of technologies, the mobile communication system has evolved to the level of being capable of providing a high speed data communication service as well as a voice telephony service. Recently, Long Term Evolution-Advanced (LTE-A), as one of the next-generation mobile communication standards, has been underway in the $3^{rd}$ Generation Partnership Project (3GPP). LTE-A aims at commercial deployment around a 2010 timeframe, and its standardization is almost complete with various technologies for accomplishing data rates higher than those of the current systems.

In line with the completion of the LTE standardization, recent studies are focused on the LTE-Advanced (LTE-A) for improving data rates with the adoption of several new techniques for the legacy LTE system. The term "LTE system" as used herein may be construed to include the legacy LTE system and the LTE-A system.

LTE is a data only communication standard, which means that it does not support voice transmission. Nevertheless, the increased data rate or bandwidth make it possible to support voice calls over the Internet, so called VoLTE. This is a technology for communicating compressed voice information over data networks such as Voice over IP (VoIP) services provided by Internet telephony (070) service providers and mobile messenger applications. However, this technology is different from VoIP because the data rate is adjusted according to the network condition and also a predetermined communication quality is guaranteed that will maintain the connection in any situation.

Although the sound quality in voice calls is important, guaranteeing the connection is more important. A robust connection requires giving up sound quality; a high sound quality requires giving up the robustness of the connection. Even though a connection may be disconnected during a communication service such as web surfing, the user may not feel significant discomfort. However, if the connection quality drops during a voice service, the voice data is lost or the connection is disconnected, which causes discomfort to the user. There is therefore a need of a technology capable of protecting against degradation of voice service quality.

DISCLOSURE OF INVENTION

Technical Problem

The present invention aims to provide a method and apparatus for improving the communication quality in a mobile communication network. An embodiment of the present invention provides a method and apparatus for protecting against voice quality degradation during an IP-based voice call operation. Also, an embodiment of the present invention provides a method and apparatus for protecting against voice quality degradation caused by a handover during a voice call operation over an LTE network.

Solution to Problem

In accordance with an aspect of the present invention, a communication quality enhancement method of a mobile communication network includes transmitting downlink packets corresponding to IP-based voice traffic to a terminal in a Radio Link Control Unacknowledged Mode (RLC UM) and storing at least one of the downlink packets for retransmission.

In accordance with another aspect of the present invention, a communication quality enhancement apparatus of a serving base station in a mobile communication network includes a transceiver for communication with at least one network node and a control unit that controls transmitting downlink packets corresponding to IP-based voice traffic to a terminal in a Radio Link Control Unacknowledged Mode (RLC UM) and storing at least one of the downlink packets for retransmission.

In accordance with another aspect of the present invention, a communication quality enhancement method of a handover target base station (eNB) in a mobile communication system includes receiving a handover request message for handover of a terminal from a source eNB transmitting an IP-based voice traffic packet to the terminal in a Radio Link Control Unacknowledged Mode (RLC UM); transmitting, when the handover of the terminal is possible, a handover request acknowledgement message to the source eNB; receiving at least one packet buffered at the source eNB among the packets transmitted from the source eNB to the terminal; and delivering the packet received from the source eNB to the terminal.

In accordance with still another aspect of the present invention, a communication quality enhancement apparatus of a target base station (eNB) in a mobile communication network includes a transceiver for communication with at least one network node and a control unit that controls receiving a handover request message for handover of a terminal from a source eNB transmitting an IP-based voice traffic packet to the terminal in a Radio Link Control Unacknowledged Mode (RLC UM); transmitting, when the handover of the terminal is possible, a handover request acknowledgement message to the source eNB; receiving at least one packet buffered at the source eNB among the packets transmitted from the source eNB to the terminal; and delivering the packet received from the source eNB to the terminal.

In accordance with another aspect of the present invention, a communication quality enhancement method of a terminal in a mobile communication network includes receiving downlink packets corresponding to IP-based voice traffic from a source base station (eNB) in a Radio Link Control Unacknowledged Mode (RLC UM), receiving a handover command message from the source eNB, transmitting a handover complete message to a target eNB based on the handover command message, and receiving at least one of the packets transmitted from the source eNB to the terminal before the start of the handover from the target eNB.

In accordance with still another aspect of the present invention, a communication quality enhancement apparatus of a terminal in a mobile communication network includes a transceiver for communication with at least one network node and a control unit that controls receiving downlink packets corresponding to IP-based voice traffic from a source base station (eNB) in a Radio Link Control Unacknowledged Mode (RLC UM), receiving a handover command message from the source eNB, transmitting a handover complete message to a target eNB based on the handover command message, and receiving at least one of the packets transmitted from the source eNB to the terminal before the start of the handover from the target eNB.

Advantageous Effects of Invention

The communication quality enhancement method and apparatus of the present invention is advantageous in terms of improving communication quality in a mobile communication network. Also, the communication quality enhancement method and apparatus of the present invention is advantageous in terms of protecting against voice quality degradation caused by a handover during an IP-based voice call operation.

Also, the communication quality enhancement method and apparatus of the present invention is advantageous in terms of enhancing voice quality by protecting against packet loss caused by inter-base station handover during a VoLTE call.

MODE FOR THE INVENTION

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention. This aims to omit unnecessary description so as to make clear the subject matter of the present invention.

Figure 1:
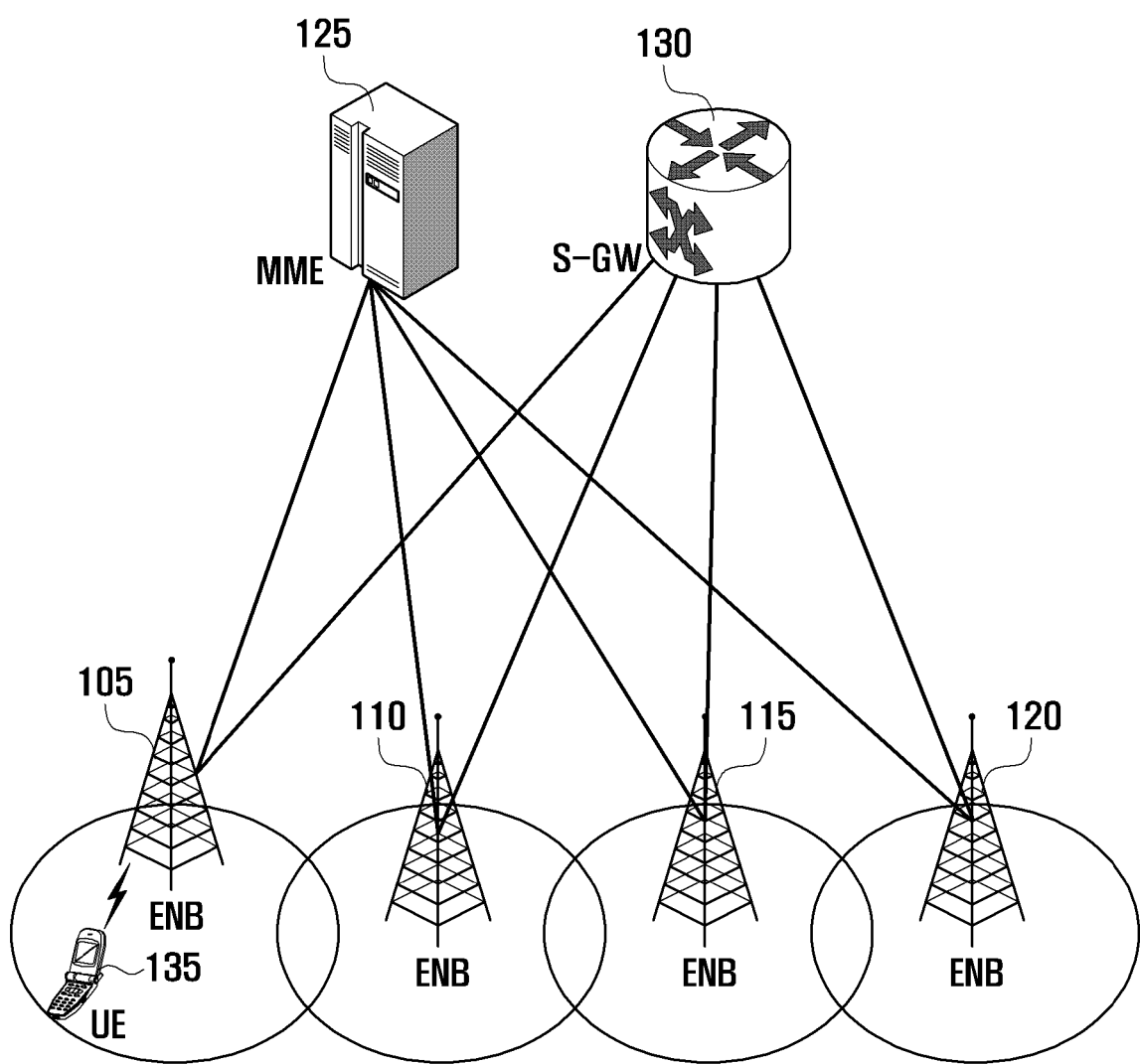
FIG. 1 is a diagram illustrating LTE system architecture to which the present invention is applied.

FIG. 1 is a diagram illustrating LTE system architecture to which the present invention is applied.

In reference to FIG. 1, the Radio Access Network 100 of the LTE system includes evolved Node Bs (eNBs) 105, 110, 115, and 120; a Mobility Management Entity (MME) 125; and a Serving Gateway (S-GW) 130. The User Equipment (UE) 135 connects to an external network via the eNBs 105, 110, 115, and 120 and the S-GW 130.

In FIG. 1, the eNBs 105, 110, 115, and 120 are equivalent to the legacy node Bs of the universal mobile telecommunications system (UMTS). The UE 135 connects to one of the eNBs via a radio channel, and the eNB has more control functions than the legacy node B. In the LTE system, all user traffic including real time services such as Voice over IP (VoIP) is served through a shared channel; thus, there is a need of an entity capable of collecting per-UE state information (such as buffer status, allowed transmission power state, and channel status) and scheduling the UEs based on the state information, and the eNBs 105, 110, 115, and 120 are responsible for these functions. Typically, one eNB has multiple cells. The LIE system adopts Orthogonal Frequency Division Multiplexing (OFDM) as a radio access technology in order to secure a data rate of up to 100 Mbps. The LTE system also adopts Adaptive Modulation and Coding (AMC) to determine the modulation scheme and channel coding rate in adaptation to the channel condition of the UE. The S-GW 130 is an entity that provides data bearers and establish and release data bearers under the control of the MME 125. The MME 125 is responsible for various control functions and maintains connections with a plurality of eNBs.

Figure 2:
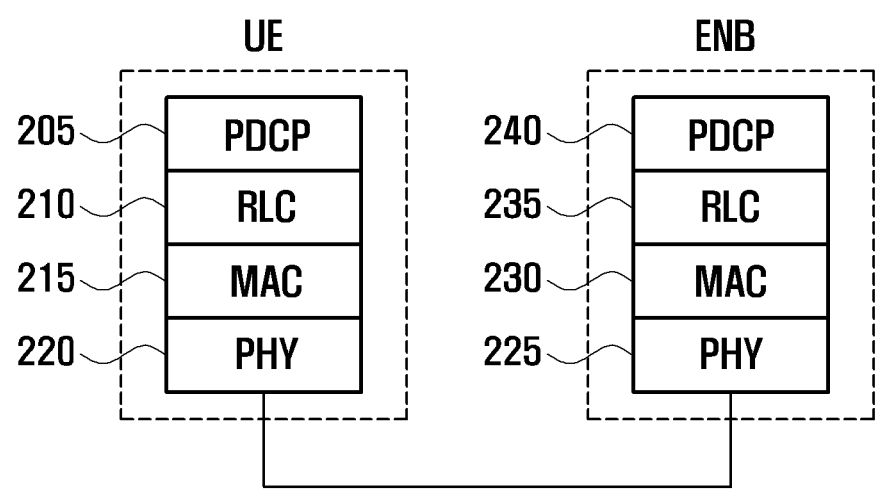
FIG. 2 is a diagram illustrating a protocol stack of an interface between a UE and an eNB in the LTE system to which the present invention is applied.

FIG. 2 is a diagram illustrating a protocol stack of an interface between a UE and an eNB in the LTE system to which the present invention is applied.

As shown in FIG. 2, the protocol stack of the interface between the UE and the eNB in the LTE system includes a packet data convergence control (PDCP) layer denoted by reference numbers 205 and 240, a radio link control (RLC) layer denoted by reference numbers 210 and 235, and a medium access control (MAC) layer denoted by reference numbers 215 and 230. The MAC layer denoted by reference number 215 and 230 allows for connection of multiple RLC entities and takes charge of multiplexing RLC PDUs from the RLC layer into a MAC PDU and demultiplexing a MAC PDU into RLC PDUs. The PHY layer denoted by reference numbers 220 and 225 takes charge of channel-coding and modulation on higher layer data to generate and transmit OFDM symbols over a radio channel and demodulating and channel-decoding on OFDM symbols received over the radio channel to deliver the decoded data to the higher layers. The PHY layer denoted by reference numbers 220 and 225 uses Hybrid Automatic Repeat Request (HARQ) for additional error correction by transmitting 1-bit information indicating positive or negative acknowledgement about data packet, the acknowledgement being transmitted from the receiver to the transmitter. The 1-bit information is referred to as acknowledgement/negative acknowledgement (ACK/NACK). The downlink HARQ ACK/NACK corresponding to an uplink transmission may be transmitted in Physical Hybrid-ARQ Indicator Channel (PHICH), and the uplink HARQ ACK/NACK corresponding to a downlink transmission may be transmitted in Physical Uplink Control Channel (PUCCH) or Physical Uplink Shared Channel (PUSCH).

Figure 3:
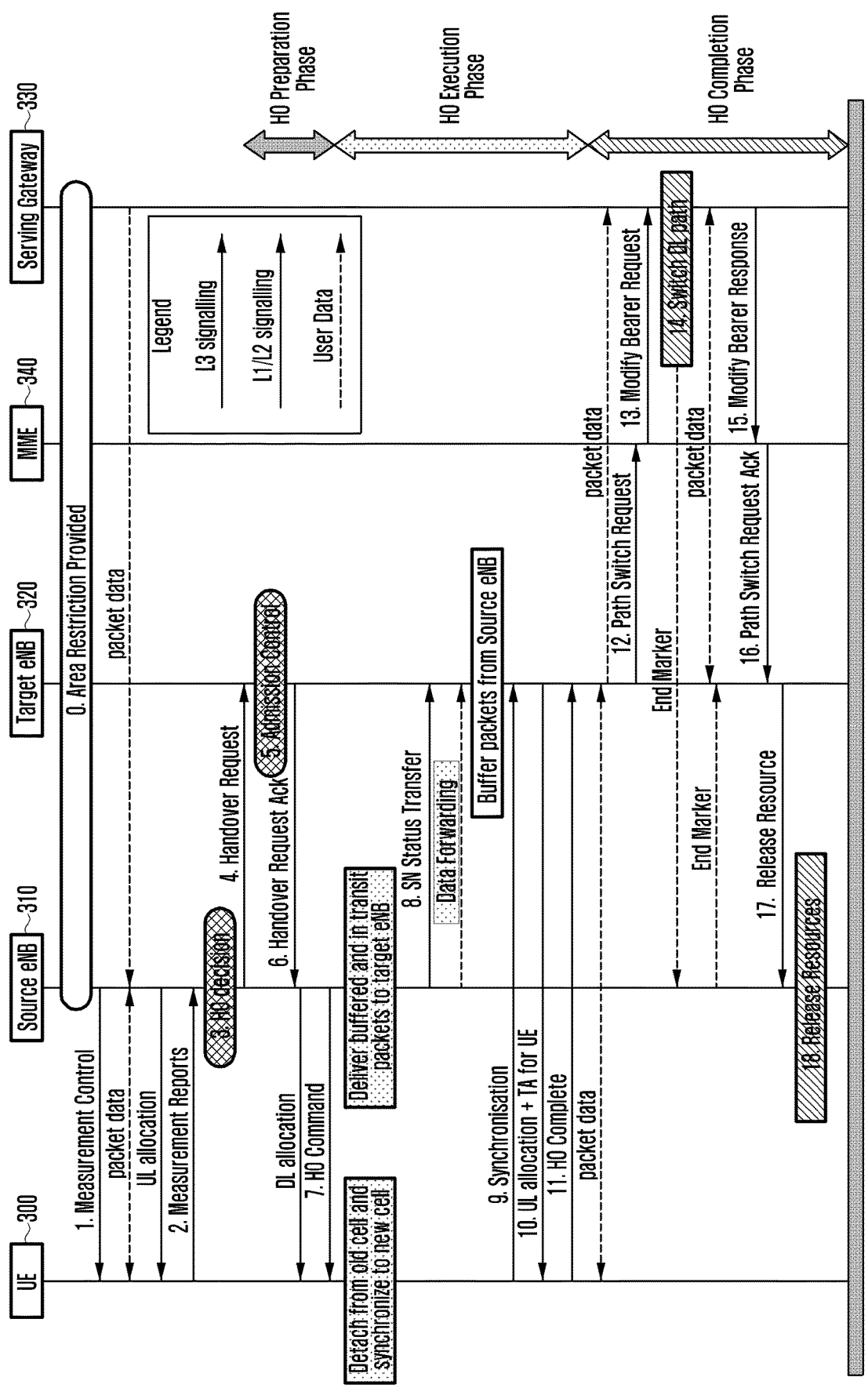
FIG. 3 is a signal flow diagram illustrating a handover procedure in an LTE system to which the present invention is applied.

FIG. 3 is a signal flow diagram illustrating a handover procedure in an LTE system to which the present invention is applied.

A description is made of a Handover (HO) procedure with reference to FIG. 3. The source eNB 310 is an eNB serving the UE 300 before the handover, and the target eNB 320 is an eNB to which the UE is handed over.

A HO preparation phase starts after the source eNB 310 makes a HO decision (by selecting the target eNB) based on a measurement report of the UE 300.

The source eNB 310 determines whether to accept the HO request and sends a HO request message to the selected target eNB 320. A HO execution phase is initiated if the target eNB 320 readily accommodates the UE based on the QoS of the active flow of the UE 300 and the load condition thereof; otherwise, the source eNB 310 may not select the eNB as a target eNB.

In the HO execution phase, the source eNB 310 delivers buffered and in-transit packets to the target eNB 320 and sends a HO command to the UE 300.

Upon receipt of the HO command, the UE 300 starts radio interface synchronization to the target eNB 320 and, if the synchronization is achieved, transmits a handover complete message to the target eNB 320. If the HO complete message is received, a HO complete step starts for the target 320 to initiate a path switch process with the source gateway 330.

If the path switch is accomplished, the target eNB 320 notifies the source eNB 310 of the HO completion.

Then the source eNB 310 releases the resources assigned to the UE 300.

The above-described procedure of FIG. 3 can be summarized as follows.

Step 0: area restriction provision step
Step 1: measurement control step
Step 2: measurement report step
Step 3: HO decision step
Step 4: HO request step
Step 5: Admission Control step
Step 6: HO request accept step
Step 7: HO command step
Step 8: SN status delivery step
Step 9: Synchronization step
Step 10: UL assignment and UE TA control step
Step 11: HO completion step
Step 12: Path switch request step
Step 13: Bearer modification request step
Step 14: DL path switch step
Step 15: Bearer modification response step
Step 16: Path switch request accept step
Step 17: Resource release instruction step
Step 18: Resource release step Meanwhile, a handover occurring during a voice call operation over an LTE network (e.g., Voice over LTE or VoLTE) may cause packet loss, resulting in voice call quality degradation. Although the following description is directed to the VoLTE, the scope of the present invention is not limited thereto and is equally applicable to other IP-based voice call services for the purpose of protecting against packet loss.

Most operators provide the VoLTE service in an RLC Unacknowledged Mode (RLC-UM). The reason why the operators provide the VoLTE service in the RLC-UM is that the VoLTE is a real time service requiring no necessity of retransmission. In VoLTE, a QCI may be set to 1.

The RLC layer is on top of the MAC layer and takes charge of data transmission reliability. The RLC layer segments and/or concatenates the RLC SDUs from the upper layer to format data in a size suitable for transmission over a radio channel The RLC layer of the receiver performs a data reassembly function to recover the original RLC SDUs from the received RLC PDUs. Each entity may operate in one of a Transparent Mode (TM), an Unacknowledged Mode (UM), and an Acknowledged Mode (AM).

In TM, the RLC SDUs are transferred to the MAC layer without addition of any header information. In UM, the RLC SDUs may be segmented/concatenated to create the RLC PDU to which header information including a sequence number is added. UM supports neither data retransmission nor data buffering. In AM, it is possible to create the RLC PDU with the RLC SDU segmentation/concatenation function and retransmit lost packets. For this retransmission function of AM, various parameters and variables such as a transmission window, a reception window, a timer, and a counter are used. In AM, particularly, various procedures and control Protocol Data Units (PDUs) are used to transmit data in the order of sequence numbers.

As described above, in the RLC-UM, the Hybrid Automatic Repeat Request (HARQ) not supported on the RLC layer and buffering is not performed on the PDCP layer. This means that there is no VoLTE traffic buffered when a handover occurs during the voice call service such as VoLTE. Since data is not buffered, the VoLTE in the RLC-UM is exposed to a potential problem of packet loss during a handover. The packet loss or service delay may be caused by external environmental factors such as timing, network delay, and RF status. The packet loss or service delay increases jitter, which gives a bad effect to the voice quality of the VoLTE service and degrades the Mean Opinion Score (MOS) value which is one of voice quality measurement criteria. There is therefore a need of a technology capable of improving voice call quality in the RLC-UM.

An embodiment of the present invention is directed to a method for improving voice quality by protecting against packet loss during a handover. A description is made of the technology for avoiding voice quality degradation by protecting against packet loss of a VoLTE call during an inter-eNB handover.

An embodiment of the present invention is directed to a method for protecting against packet loss and voice quality degradation during a handover in such a way that when a handover occurs a source eNB forwards a predetermined number of packets buffered before the occurrence of the handover to a target eNB.

According to a simulation, the packets having the highest packet loss probability in handover during a VoLTE call are the last one or two packets transmitted to the UE to be handed over by the source eNB. Accordingly, it is preferred to buffer predetermined packets of downlink voice traffic (e.g., the last one or two packets transmitted to the UE to be handed over) during the VoLTE call in the RLC-UM. That is, predetermined packets may be stored ephemerally. The PDCP layer of the source eNB may buffer the predetermined packets of the downlink voice traffic.

Then the source eNB may forward the buffered packets to the target eNB when an inter-eNB handover occurs. That is, the PDCP layer of the eNB may forward the last packets buffered before a path switch request to the target eNB.

If the buffered packets are received, the target eNB may deliver the received packets to the UE handed over thereto. The method according to an embodiment of the present invention is capable of protecting against voice quality degradation during a handover by retransmitting the packets having the highest loss probability. If the received packets are identical with the previously received packets, the eNB does not decode the corresponding packets; otherwise, if the received packets are the packets lost in the previous transmission, the eNB decodes the corresponding packets.

Figure 4:
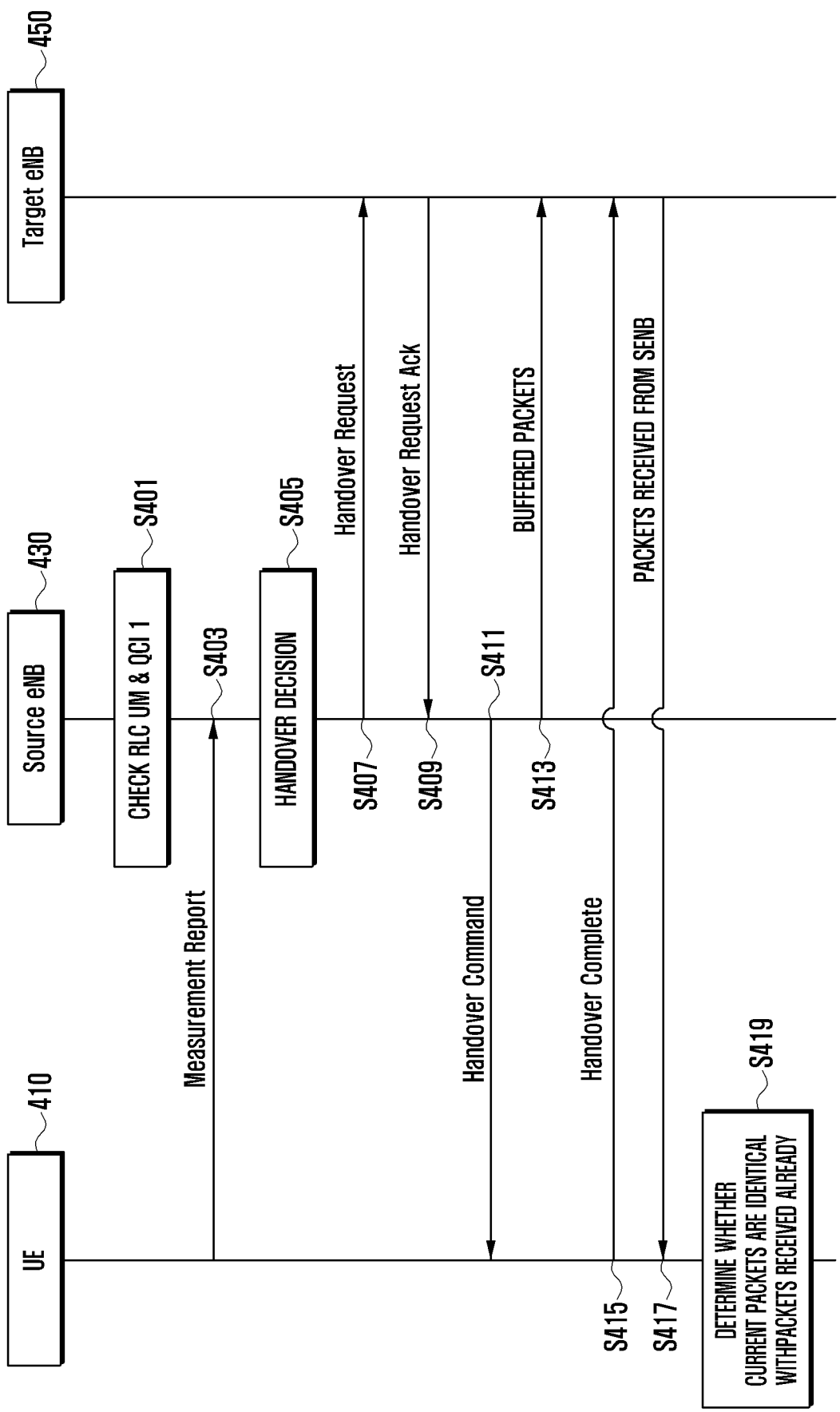
FIG. 4 is a signal flow diagram illustrating a voice quality enhancement method according to an embodiment of the present invention.

FIG. 4 is a signal flow diagram illustrating a voice quality enhancement method according to an embodiment of the present invention. In reference to FIG. 4, a mobile communication network includes a UE 410, a Source eNB (SeNB) 430, and a Target eNB (TeNB) 450. The SeNB 430 may determine whether it provides the UE 410 with a VoLTE call service in the RLC UM at step S401. If it is determined that QCI 1 is configured in the RLC UM, the SeNB 430 determines that it provides the UE 410 with the VoLTE service. The UE 410 and the SeNB 430 may communicate packets for the VoLTE service. The SeNB 430 may transmit downlink packets to the UE 410. The SeNB 430 may transmit the downlink packets to the UE 410 at an interval of 20 ms. In the following description, it is assumed that packets are the downlink packets for the VoLTE service in the RLC UM.

In an embodiment of the present invention, if the SeNB 430 is transmitting downlink packets to the UE for the VoLTE service in the RLC UM, it may be buffering a predetermined number of downlink packets. In an embodiment of the present invention, this predetermined number of downlink packets is referred to as a configured number of buffered packets. The SeNB determines the number of most recently transmitted packets to buffer according to the configured number of buffered packets. At this time, the SeNB 430 may store the downlink packets transmitted to the UE 410 based on the configured number of buffered packets. If the SeNB 430 is transmitting VoLTE service packets to the UE 410 in RLC UM, it may repeat a storing or buffering operation. Through this repetition, the SeNB may store and update the packets equal in number to or less than the configured number of buffered packets. The number of packets may be updated and maintained to be equal to or less than the configured number of buffered packets in such a way of deleting oldest packet and storing the packet transmitted most recently. The buffering operation is described in more detail later with reference to FIG. 6.

The SeNB 430 may receive a Measurement Report from the UE 410 at step S403. At step S450, the SeNB 430 may determine a target eNB and makes a handover (HO) decision based on the measurement report transmitted by the UE 410.

The SeNB 430 may send the TeNB 450 a Handover Request at step S407. If the handover request message is received, the TeNB 450 may determine whether to accept the handover of the UE 410 based on QoS and load condition.

If it is determined to accommodate the handover of the UE 410, the TeNB 450 may send the SeNB 430 a Handover Request Acknowledgement (Ack) at step S409. If it is determined to reject the handover of the UE 410, the TeNB 450 may send the SeNB 430 a Handover Request Negative-Acknowledgement (Nack).

If the Handover Request Ack is received, the SeNB 430 may send the UE 410 a Handover command at step S411.

After transmitting the Handover command, the SeNB 430 may forward buffered packets to the TeNB 450 at step S413. The SeNB 430 and the TeNB 450 may be connected through an X2-interface through which the buffered packets are transmitted. However, it is not mandatory that the handover command and the buffered packets be transmitted in such order. That is, the buffered packets may be transmitted to the TeNB 450 before the handover command is transmitted to the UE 410.

If the handover command is received, the UE may start synchronization with the TeNB and, if the synchronization is achieved, send the TeNB 450 a Handover Complete message 415.

The TeNB 450 may deliver the buffered packets received from the SeNB 430 to the UE 410 at step S417. The buffered packet transmission procedure is described in more detail later with reference to FIG. 6.

The UE 410 may determine whether the buffered packets received from the TeNB 405 match with any previously received packets. That is, the buffered packets are packets that the SeNB 430 has transmitted to the UE 410 before the handover is triggered. The UE 410 may or may not have received the packets transmitted by the SeNB 430 right before the handover initiation. Accordingly, it is necessary to determine whether the packets received from the TeNB 450 were received from the SeNB 430 already before the handover.

For example, the UE 410 may determine on the basis of the RTP sequence numbers of the packets whether the currently received packets were received before the handover. If the packets were received before the handover, the UE discards the corresponding duplicates. If the packets were not received before the handover, the UE decodes the corresponding packets for use. The legacy RLC-UM, which does not support buffering and retransmission operations, has a drawback of communication quality degradation caused by packet loss or delay. The method of the present invention is capable of improving the communication quality by buffering the packets having the highest loss probability in a handover situation and forwarding, when a handover occurs, the buffered packets to the TeNB, which delivers the buffered packets to the UE.

Figure 5:
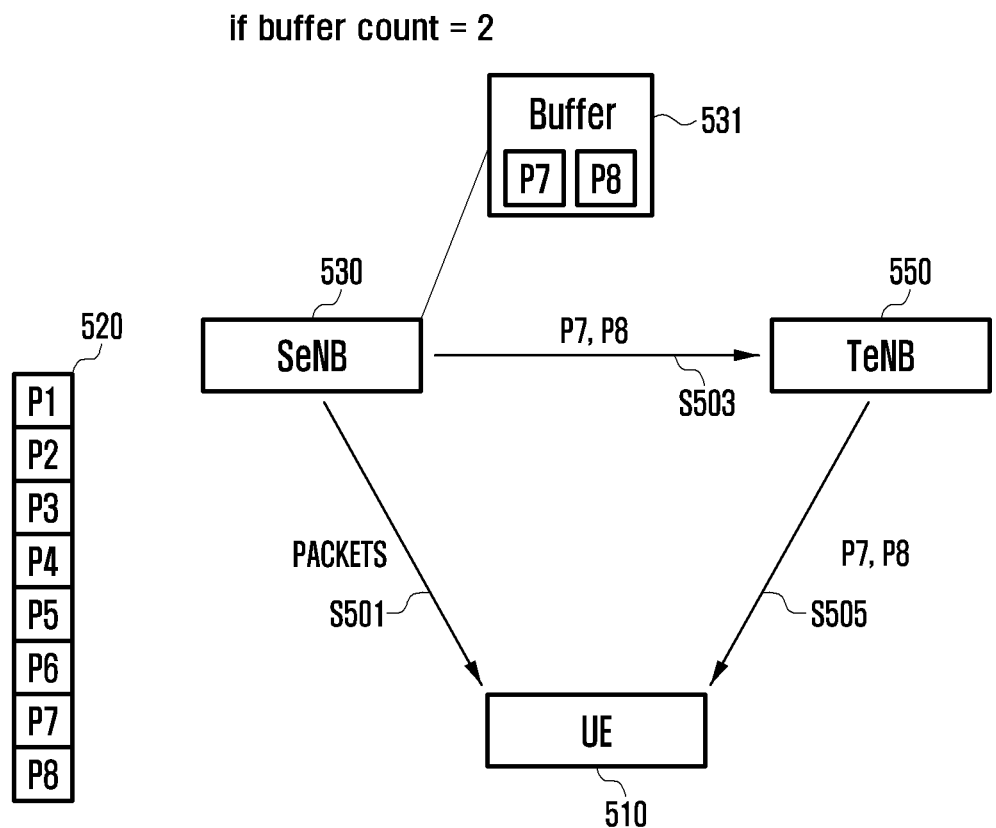
FIG. 5 is a diagram illustrating a packet transmission mechanism according to an embodiment of the present invention.

FIG. 5 is a diagram illustrating a packet transmission mechanism according to an embodiment of the present invention.

A mobile communication network may include a UE 510, an SeNB 530, and a TeNB 550. The SeNB may include a buffer 531 for buffering packets. The buffer 531 may store ephemerally the most recent packets transmitted to the UE. The most recent packets are a predetermined number of packets that the SeNB has transmitted to the UE most recently.

A buffer counter is the information indicating the number of packets stored in the SeNB 530. The buffer counter may be equal to or less than a configured number of buffered packets. In the embodiment of FIG. 5, if the configured number of buffered packets is 2, the buffer count may be set to 0, 1, or 2. However, the configured number of buffered packets is not limited thereto and may be set to n. If the configured number of buffered packets is n, the buffer count may be a value in the range of 0~n. In the embodiment of FIG. 5, it is assumed that the SeNB 530 transmits 8 packets before the handover of the UE 510 is triggered. The packets are VoLTE service packets transmitted in the RLC UM. It is assumed that the SeNB 530 transmits the packets 520 to the UE 510 in the order numbered as shown in FIG. 5. That is, the packet P1 is transmitted first, and the packet P8 is transmitted last. Meanwhile, the SeNB 530 does not know whether the packets are successively received by the UE. The packets 520 may be delivered to the UE 510 at step S501.

In the embodiment of FIG. 5, the buffer count is 0 before the SeNB 530 transmits the packet P1 because there is no packet preceding the packet P1. If the packet P1 is transmitted, the buffer count increases to 1, and the packet P1 is buffered in the buffer 531. If the SeNB 530 transmits the packet P2, the buffer count increases to 2, and the packet P2 is buffered in the buffer 531 along with the packet P1. If the SeNB 530 transmits the packet P3, the packet P1 is discarded and the packet P3 is buffered in the buffer 531 along with the packet P2 because the configured number of buffered packet is 2. The packets buffered in the buffer 531 and the buffer count are managed in this way.

If the last packet that the SeNB 530 has transmitted before the handover is the packet P8 and the buffer count is 2, the buffer 531 may have the packets P7 and P8.

The SeNB 530 may forward the packets P7 and P8 buffered in the buffer 531 to the TeNB 550 at step S520. The buffered packets P7 and P8 may be transmitted after the SeNB 530 transmits a handover command to the UE 510. However, the transmission timing is not limited thereto.

The TeNB 550 may already have the packets P7 and P8 received from the SeNB. The TeNB 550 may deliver the packets P7 and P8 to the UE 510 at step S505. The TeNB 550 may transmit the packets P7 and P8 to the UE 50 upon receipt of a handover complete message. If the packets P7 and P8 are received from the TeNB 550, the UE 510 may use these packets P7 and P8 to improve the communication quality.

In the above embodiment, the UE 510 may or may not have received the packets P7 and P8 from the SeNB 530 before the handover. If the packets P7 and P8 were received successfully before the handover, this means that all packets have been received without loss and the communication quality is not affected. However, if the packets P7 and P8 were not received before the handover, the packet loss may have a bad effect on the communication quality; however, in an embodiment of the present invention the SeNB 530 stores and forwards the last packets P7 and P8 having the highest loss probability to the TeNB 550 such that the TeNB 550 delivers the packets P7 and P8 to the UE. In this case, the packets P7 and P8 lost between the SeNB 530 and the UE can be recovered because the TeNB delivers the packets P7 and P8 that also have been forwarded to the TeNB, which delivers the lost packets P7 and P8 forwarded by the SeNB 530 to the UE.

Figure 6:
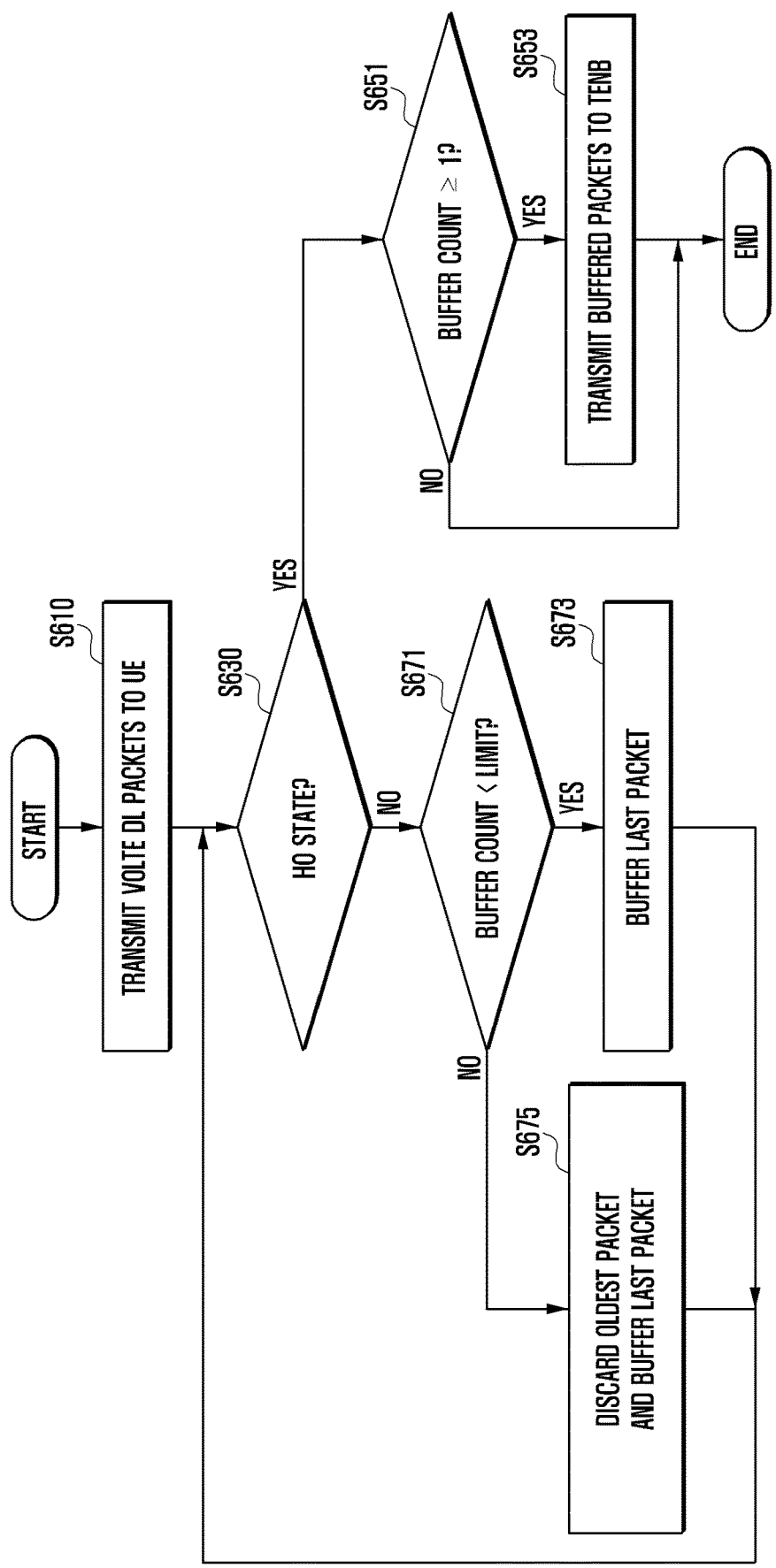
FIG. 6 is a flowchart illustrating a communication quality enhancement method of an SeNB according to an embodiment of the present invention.

FIG. 6 is a flowchart illustrating a communication quality enhancement method of an SeNB according to an embodiment of the present invention. A description is made of a procedure for the SeNB to buffer packets and transmit the buffered packets with reference to FIG. 6. Since the handover signal flows among the SeNB, the UE, and the TeNB have been described with reference to FIG. 4, detailed descriptions thereof are omitted herein. It is assumed that the SeNB is providing the UE with a VoLTE service in the RLC UM and the UE is handed over from the SeNB to the TeNB.

If the SeNB is providing the UE with the VoLTE service in the RLC UM, the SeNB may transmit VoLTE downlink packets to the UE at step S610. The SeNB may determine whether to trigger handover at step S630.

If it is determined not to trigger handover, the SeNB may store the latest packets transmitted to the UE. The SeNB may determine whether a buffer count is equal to or less than a limit value at step S671. The limit value may be the configured number of buffered packets. The limit value or the configured number of buffered packets may be set by the eNB operator. In order to achieve the effect of the present invention, the configured number of buffered packets may be set to 1 or 2. However, the configured number of buffered packets is not limited thereto and may be set to a value of n.

If it is determined the buffer count is equal to or less than the limit value, the SeNB may store the packets transmitted most recently at step S673. If it is determined that the buffer count is greater than the limit value, the SeNB may discard the oldest one of the buffered packets and buffer the newly transmitted packet. Then the procedure may return to step S630 to perform packet buffering until a handover is triggered.

If it is determined at step S630 that a handover is triggered, the SeNB may forward the buffered packets to the TeNB. For example, the SeNB may determine at step S651 whether the buffer count is equal to or greater than 1. The buffer count may correspond to the number of packets stored in the buffer. If the buffer count is equal to or greater than 1, this means that one or more packets are stored in the buffer. If the buffer count is equal to or greater than 1, the SeNB may transmit the buffered packets to the TeNB at step S653.

If the buffer count is 0, this means that there is no buffered packet; thus, the SeNB ends the procedure without forwarding any packet to the TeNB.

Figure 7:
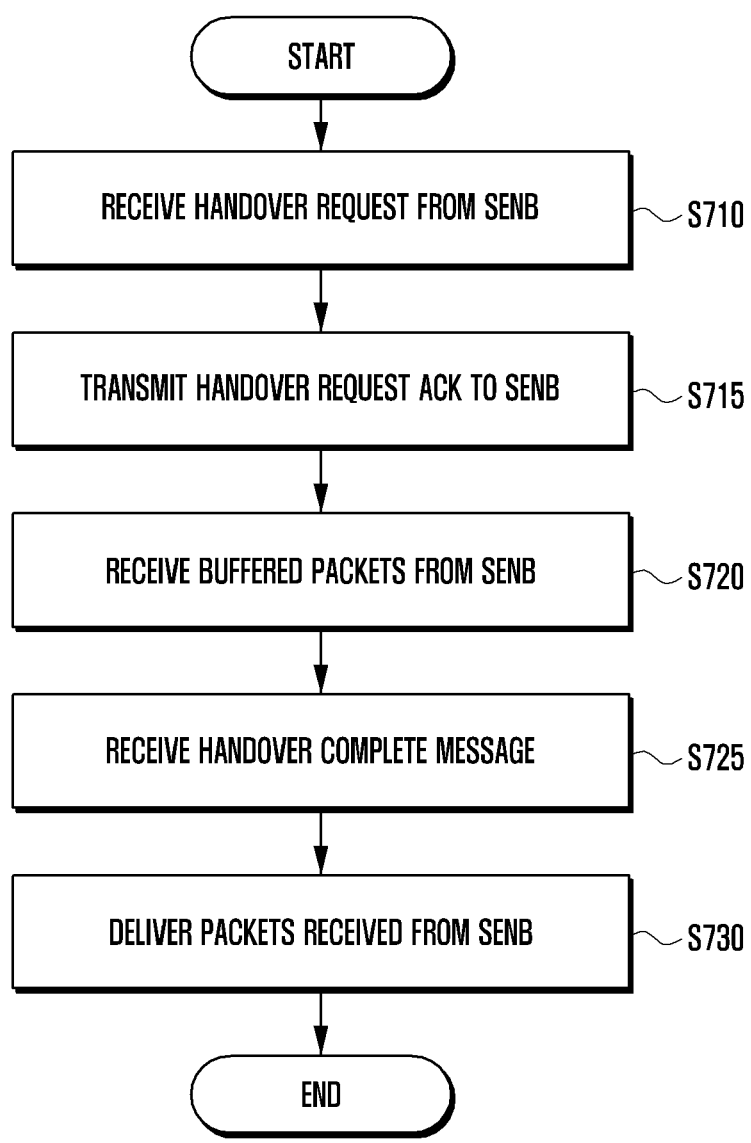
FIG. 7 is a flowchart illustrating a communication quality enhancement method of a TeNB according to an embodiment of the present invention.

FIG. 7 is a flowchart illustrating a communication quality enhancement method of a TeNB according to an embodiment of the present invention. It is assumed that the SeNB is providing the UE with a VoLTE service in the RLC UM and the UE is handed over from the SeNB to the TeNB.

In reference to FIG. 7, the TeNB may receive a handover request message from the SeNB at step S710. If the handover request message is received, the TeNB may determine whether to accommodate the handover of the UE based on the QoS and load condition.

If it is determined to accommodate the handover, the TeNB may transmit a handover request acknowledgement (Handover Request Ack) message to the SeNB at step S715.

The TeNB may receive the buffered packets from the SeNB at step S720. That is, if a handover request acknowledgement message is received from the TeNB at step S715, the SeNB may transmit the packets buffered in its buffer to the TeNB. The TeNB and SeNB may communicate and exchange packets through an X2-interface.

The TeNB may receive a handover complete message from the UE at step S725. The UE may receive a handover command from the SeNB and, if it achieves synchronization with the TeNB, transmit the handover complete message.

The TeNB may deliver the buffered packets received from the SeNB to the UE at step S730. The buffered packets are the packets transmitted from the SeNB to the UE before the handover. The UE receives the buffered packets via the TeNB, thereby improving the communication quality.

Figure 8:
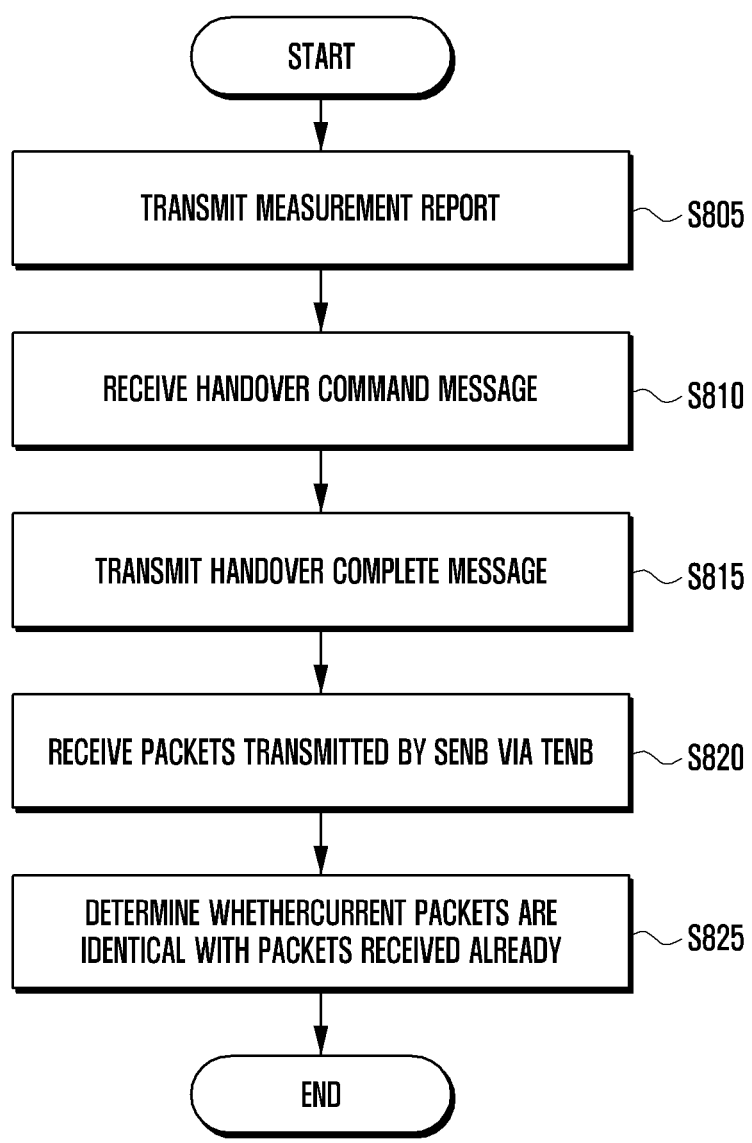
FIG. 8 is a flowchart illustrating a communication quality enhancement method of a UE according to an embodiment of the present invention.

FIG. 8 is a flowchart illustrating a communication quality enhancement method of a UE according to an embodiment of the present invention. It is assumed that the SeNB is providing the UE with a VoLTE service in the RLC UM and the UE is handed over from the SeNB to the TeNB.

In reference to FIG. 8, the UE may transmit a measurement report to the SeNB at step S805. The SeNB may make a handover decision and select the target eNB based on the measurement report transmitted by the UE.

If the handover decision is made, the UE may receive a handover command from the SeNB at step S810 according to the result of handover request and response messages exchange between the SeNB and TeNB.

The UE may transmit a handover complete message to the TeNB at step S815. The UE may transmit the handover complete message to the TeNB when it achieves synchronization with the TeNB based on the handover command received from the SeNB.

The UE may receive the packets transmitted by the SeNB via the TeNB at step S820. The packets received via the TeNB may be the last packets that the SeNB transmitted to the UE before the handover.

The UE may determine at step S825 whether the packets received from the TeNB are identical with any packets received already from the SeNB. For example, the UE may determine on the basis of the RTP sequence numbers of the packets whether the currently received packets were received before the handover. If the packets were received before the handover, the UE discards (or deletes) the corresponding packets. If the packets are discarded, this means that the UE omits decoding the received packets.

Otherwise if the packets were not received before the handover, the UE may decode the received packets for use. The UE may not receive the packets transmitted by an eNB according to various network conditions such as transmission delay and packet loss. Particularly, the packets transmitted from the SeNB to the UE immediately before the handover are likely to be lost.

The legacy RLC-UM, which does not support buffering and retransmission operations, provides no mechanism of receiving again from the TeNB the packets transmitted by the SeNB. The method according to an embodiment of the present invention allows the UE to receive the latest packets from the SeNB and receive again from the TeNB the latest packets transmitted by the SeNB. This also makes it possible to determine whether a method according to an embodiment of the present invention is applied.

Figure 9:
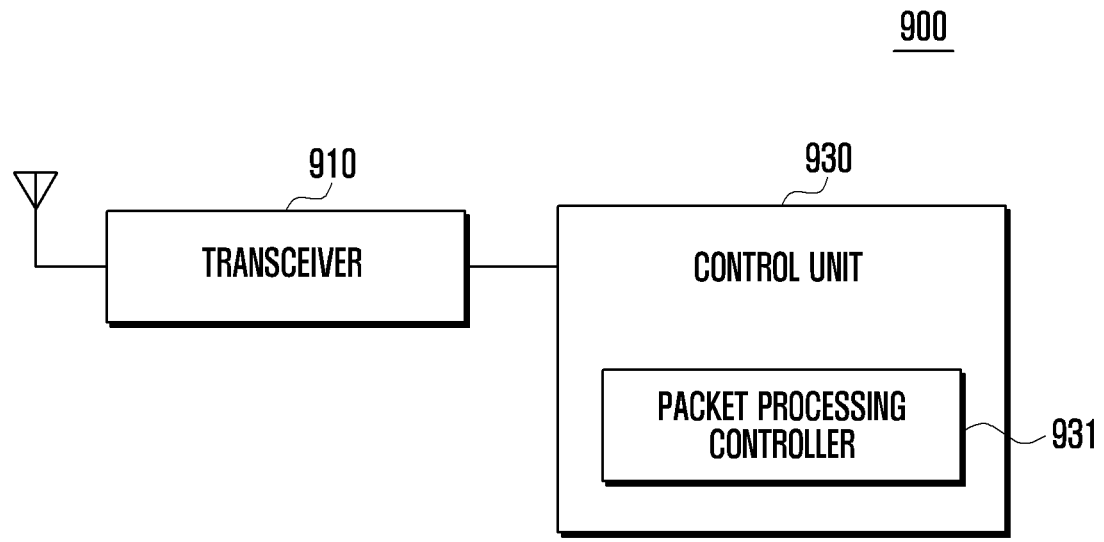
FIG. 9 is a block diagram illustrating a configuration of an eNB according to an embodiment of the present invention.

FIG. 9 is a block diagram illustrating a configuration of an eNB according to an embodiment of the present invention. An eNB may operate as an SeNB or a TeNB depending on the situation.

The eNB 900 may include a transceiver 910 for communication with at least one network node and a control unit 930 for controlling overall operations of the eNB 900. The control unit 930 may include a packet processing controller for controlling packet buffering and transmission.

A description is made of the operations of the eNB as an SeNB.

According to an embodiment of the present invention, the packet processing controller 931 may control transmitting downlink packets of IP-based voice traffic to the UE in the Radio Link Control Unacknowledged Mode (RLC UM) and storing at least one of the downlink packets for retransmission.

The packet processing controller 931 may also make a handover decision based on the measurement report transmitted by the UE and, if the handover is triggered, controls the SeNB to transmit the stored packet to the handover TeNB.

The packet processing controller 931 may also control the SeNB to buffer the latest packets transmitted to the UE before the start of the handover, based on a configured number of buffered packets. At this time, the configured number of buffered packets may be 1 or 2. However, the configured number of buffered packets is not limited thereto and may be set to a value of n.

The packet processing control unit 931 may also control the SeNB to store, when a buffer count indicating the number of stored packets is less than the configured number of buffered packets, the latest packets transmitted to the UE before the start of the handover and to discard, when the buffer count is equal to or greater than the configured number of buffered packets, the oldest one of the stored packets and store the latest packet transmitted to the UE before the start of the handover.

The IP-based voice traffic may be Voice over LTE (VoLTE) traffic.

A description is made of the operations of the eNB as a TeNB.

According to an embodiment of the present invention, the packet processing controller 931 may control the TeNB to receive a handover request message for a UE from an SeNB transmitting packets of IP-based voice traffic to the UE in the RLC UM; transmit, when it can accommodate the handover of the UE, a handover request acknowledgement message to the SeNB; receive at least one packet stored in the SeNB among the packets transmitted from the SeNB to the UE; and deliver the packets received from the SeNB to the UE.

The packet processing controller 931 may also control the TeNB to receive a handover complete message from the UE and transmit, when the handover complete message is received, the packets received from the SeNB to the UE. At this time, the packets received from the SeNB may be one or two most-recent packets among the packets transmitted from the SeNB to the UE before the start of the handover. Also, the IP-based traffic may be VoLTE traffic.

Although the eNB 900 is illustrated as having separated function blocks for convenience of explanation, the configuration of the eNB 900 is not limited thereby. For example, the control unit 930 may take charge of the functions of the packet processing controller 931. The control unit 930 and the packet processing controller 931 may control the operations of the eNB that have been described in the embodiments of FIGS. 1 to 8 as well as the operations described with reference to FIG. 9.

Figure 10:
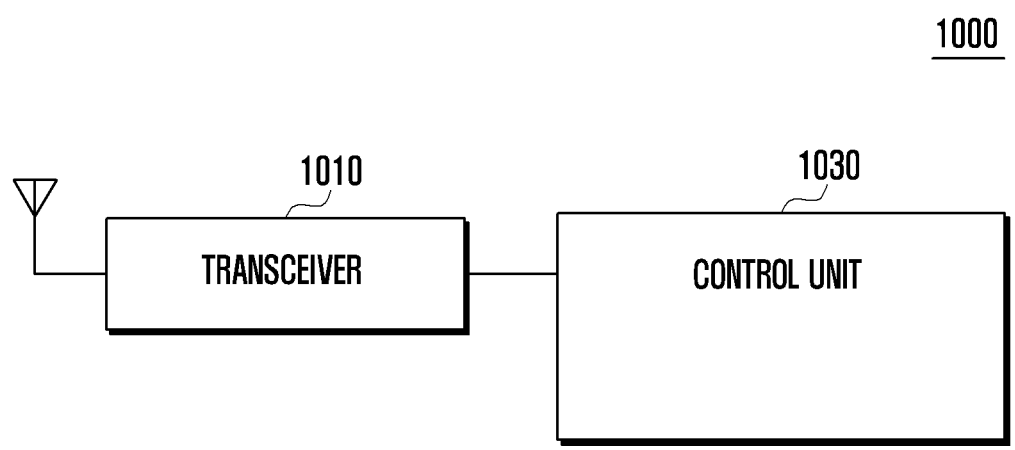
FIG. 10 is a block diagram illustrating a configuration of a UE according to an embodiment of the present invention.

FIG. 10 is a block diagram illustrating a configuration of a UE according to an embodiment of the present invention.

In reference to FIG. 10, the UE 1000 may include a transceiver for communication with at least one network entity and a control unit 1030 for controlling overall operations of the UE 1000.

According to an embodiment of the present invention, the control unit 1030 may control the UE to receive downlink packets of IP-based voice traffic and a handover command message from an SeNB in the RLC UM, transmit a handover complete message to a TeNB based on the handover command message, and receive from the TeNB at least one of the packets that have been transmitted from the SeNB to the UE.

The control unit 1030 may determine whether the packets received from the TeNB were received previously from the SeNB and control the UE to discard, if the packets were received from the SeNB, the packets received from the TeNB and to decode for use, if the packets were not received from the SeNB, the packets received from the TeNB.

The control unit 1030 may also determine whether the packets received from the TeNB were received from the SeNB based on the RTP sequence numbers of the packets. At this time, the IP-based voice traffic may be VoLTE traffic.

Although the UE 1000 is illustrated as having separated function blocks for convenience of explanation, the configuration of the UE 1000 is not limited thereby. The control unit 1030 may control the operations of the UE that have been described in the embodiments of FIGS. 1 to 8 as well as the operations described with reference to FIG. 10.

Although various embodiments of the present invention have been described using specific terms, the specification and drawings are to be regarded in an illustrative rather than a restrictive sense in order to help understand the present invention. Thus the scope of the invention should not be construed as being limited to the exemplary embodiments, but it should be recognized as contemplating various changes and modifications within the spirit and scope of the invention.

The invention claimed is:
1. A communication quality enhancement method of a source base station, the method comprising: identifying voice over long term evolution (VoLTE) traffic based on a quality of service class indicator (QCI) configuration; iden- tifying, by a controller, whether packets corresponding to the VoLTE traffic are transmitted to a terminal in a radio link control unacknowledged mode (RLC UM) in which automatic repeat request (ARQ) is not supported on an RLC layer; storing, by the controller, at least one of the packets corresponding to the IP-based voice traffic in case that the packets corresponding to the IP-based voice traffic are transmitted to the terminal in the RLC UM; identifying whether a number of stored packets is greater than a preconfigured number; deleting an oldest one of the stored packets, in case that the number of stored packets is greater than the preconfigured number; receiving, from the terminal, a measurement report; determining a handover to a target base station based the measurement report; and transmitting, by the source base station, the at least one of the stored packets to the target base station before completion of the handover, as a response to the determination.

2. The method of claim 1, wherein the at least one of the packets are buffered in a packet data convergence control (PDCP) layer.

3. The method of claim 1, wherein the source base station transmits the at least one of the stored packets to the target base station via an X2-interface.

4. A communication quality enhancement apparatus of a source base station in a mobile communication network, the apparatus comprising: a transceiver for communication with at least one network node; and a controller configured to: identify voice over long term evolution (VoLTE) traffic based on a quality of service class indicator (QCI) configuration, identify whether packets corresponding to the VoLTE traffic are transmitted to a terminal in a radio link control unacknowledged mode (RLC UM) in which automatic repeat request (ARQ) is not supported on an RLC layer, store at least one of the packets corresponding to the IP-based voice traffic in case that the packets corresponding to the IP-based voice traffic are transmitted to the terminal in the RLC UM, identify whether a number of stored packets is greater than a preconfigured number, delete an oldest one of the stored packets, in case that the number of stored packets is greater than the preconfigured number, control the transceiver to receive, from the terminal, a measurement report, determine a handover to a target base station based the measurement report, and control the transceiver to transmit, from the source base station, the at least one of the stored packets to the target base station before completion of the handover, as a response to the determination.

5. The apparatus of claim 4, wherein the at least one of the packets are buffered in a packet data convergence control (PDCP) layer.

6. The apparatus of claim 4, wherein the source base station transmits the at least one of the stored packets to the target base station via an X2-interface.

7. A communication quality enhancement method of a target base station, the method comprising: receiving, by a transceiver, a handover request message for a handover of a terminal, from a source base station transmitting packets corresponding to voice over long term evolution (VoLTE) traffic to the terminal in a radio link control unacknowledged mode (RLC UM); transmitting, by the transceiver, when the handover of the terminal is possible, a handover request acknowledgement message to the source base station; receiving, by the transceiver, at least one packet stored at the source base station among packets transmitted from the source base station to the terminal before the handover in the RLC UM; and transmitting, by the transceiver, the at least one packet received from the source base station to the terminal, wherein a number of the at least one packet is identified by the source base station, and wherein, in case that the number of the at least one packet is greater than a preconfigured number, an oldest one of the at least one packet is deleted, wherein the VoLTE traffic is identified based on a quality of service class indicator (QCI) configuration.

8. A communication quality enhancement apparatus of a target base station, the apparatus comprising: a transceiver for communication with at least one network node; and a controller configured to: control the transceiver to receive a handover request message for a handover of a terminal, from a source base station transmitting packets corresponding to voice over long term evolution (VoLTE) traffic to the terminal in a radio link control unacknowledged mode (RLC UM), when the handover of the terminal is possible, control the transceiver to transmit a handover request acknowledgement message to the source base station, control the transceiver to receive at least one packet stored at the source base station among packets transmitted from the source base station to the terminal before the handover in the RLC UM, and control the transceiver to transmit the at least one packet received from the source base station to the terminal, wherein a number of the at least one packet is identified by the source base station, and wherein, in case that the number of the at least one packet is greater than a preconfigured number, an oldest one of the at least one packet is deleted, wherein the VoLTE traffic is identified by the source base station based on a quality of service class indicator (QCI) configuration.

9. The apparatus of claim 8, wherein the controller is further configured to: control the transceiver to receive a handover complete message from the terminal, and in response to receiving of the handover complete message, control the transceiver to transmit the at least one packet received from the source base station to the terminal.

10. The apparatus of claim 8, wherein the at least one packet received from the source base station is the last one or two of the packets transmitted from the source base station to the terminal before a start of the handover.

11. A communication quality enhancement method of a terminal, the method comprising: receiving, by the terminal, packets corresponding to voice over long term evolution (VoLTE) traffic from a source base station in a radio link control unacknowledged mode (RLC UM); receiving, by the terminal, a handover command message for a handover to a target base station, from the source base station; transmitting, by the terminal, a handover complete message to the target base station as a response to the handover command message; and receiving, by the terminal, packets corresponding to at least one of the packets received from the source base station, from the target base station in the RLC UM, wherein the packets received from the target base station in the RLC UM is transmitted from the source base station to the target base station before completion of the handover, as a response to the source base station determining the handover, wherein the VoLTE traffic is identified by the source base station based on a quality of service class indicator (QCI) configuration.

12. The method of claim 11, further comprising: decoding the at least one of the packets received from the target base station based on a determination that the at least one of the packets were not received prior to the handover to the target base station.

* * * * *